(No Model.) 2 Sheets—Sheet 1.

E. N. REYNIER.
SECONDARY BATTERY.

No. 438,827. Patented Oct. 21, 1890.

Witnesses:
L. N. Legendre
George Barry.

Inventor
Emile Nicolas Reynier
by Attorneys

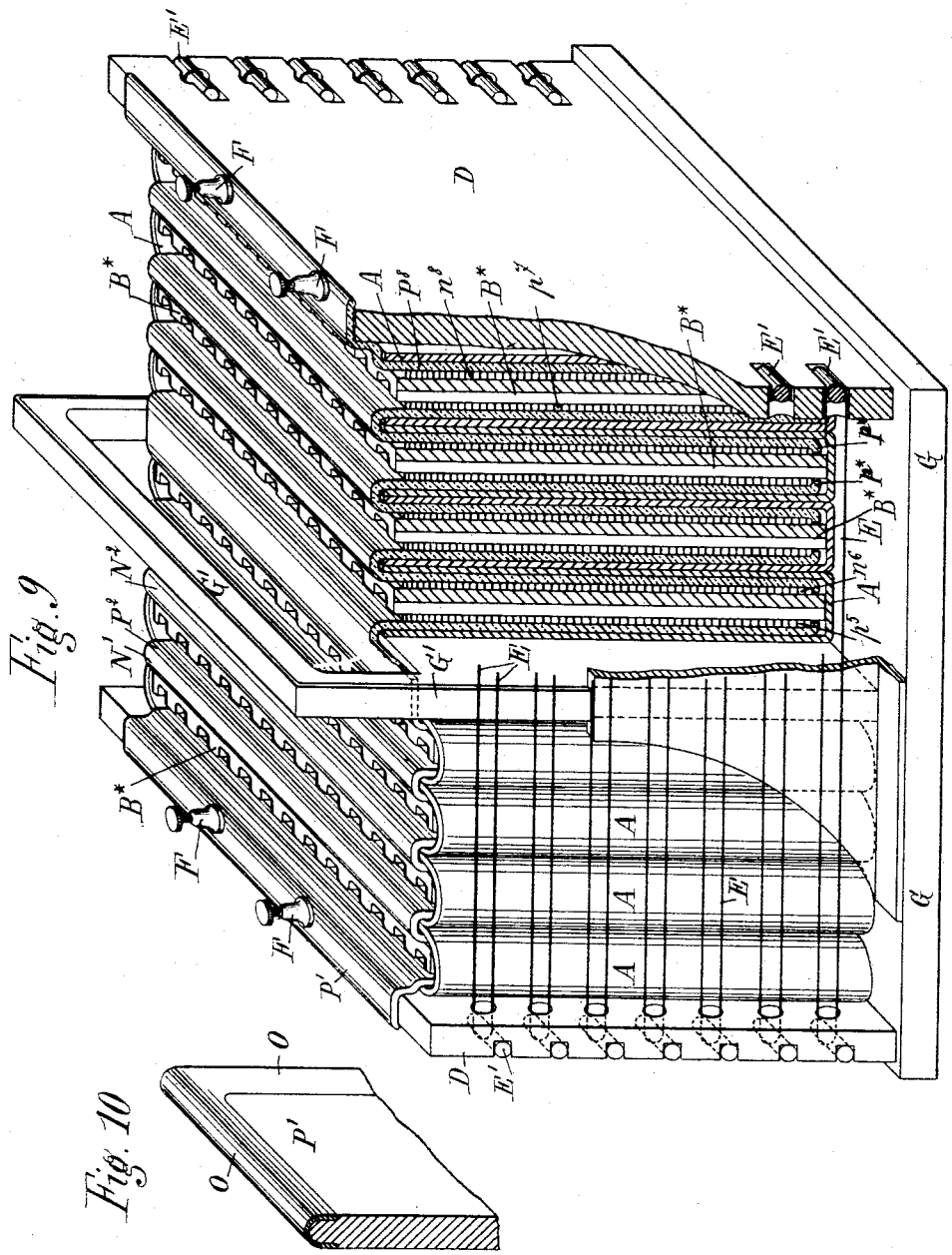

UNITED STATES PATENT OFFICE.

EMILE NICOLAS REYNIER, OF PARIS, FRANCE.

SECONDARY BATTERY.

SPECIFICATION forming part of Letters Patent No. 438,827, dated October 21, 1890.

Application filed August 23, 1890. Serial No. 362,865. (No model.) Patented in France July 3, 1889, No 199,341; in England July 17, 1889, No. 11,471, and in Germany August 22, 1889, No. 50,854.

*To all whom it may concern:*

Be it known that I, EMILE NICOLAS REYNIER, a citizen of the Republic of France, and a resident of Paris, in said Republic, have invented a new and useful Improvement in Electrical Storage-Batteries, (for which I have obtained Letters Patent of Great Britain, No. 11,471, dated July 17, 1889; Brevet d'Invention of France, No. 199,341, dated July 3, 1889, and Letters Patent of Germany, No. 50,854, dated August 22, 1889,) of which the following is a specification, reference being had to the accompanying drawings.

My invention has for its object to permit the active pulverulent matters which cover the electrode-plates of electric storage batteries or accumulators to expand free during the charge or discharge, according to the nature of the accumulators, and to maintain the said active matters pressed against the electrodes when they afterward contract during the discharge or during the charge.

The improvement consists, essentially, in placing the ordinary electrode-plates suitably isolated in a supple, not rigid, cell or receiver, and arranging on both sides of this cell or receiver parallel with the electrodes rigid clamping or compression plates, the said clamping-plates tending to be constantly brought toward each other by elastic organs, such as springs.

My invention is applicable to four kinds of accumulators already in use—viz., lead-sulphuric acid, (Planté system,) lead-sulphate of zinc, lead-sulphate of copper, alkaline-copper zincous—and to all other kinds in which an electrode or two electrodes have for their active matters substances insoluble in the battery-liquid, as finely-subdivided metals, oxides of manganese, of iron, &c., which require to be maintained in good contact with the electrode.

I will first describe my invention with reference to the drawings in its application to the Planté (lead-sulphuric-acid) system.

Figure 1:
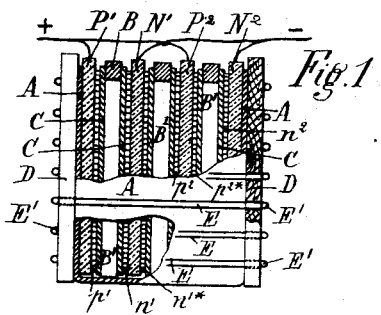
Figure 3:
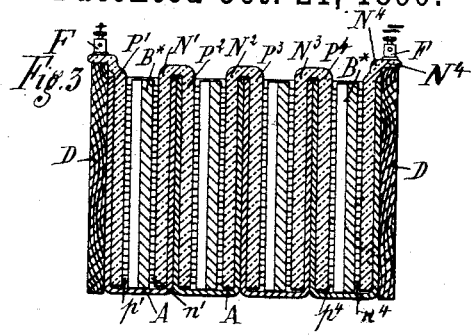
Figure 2:
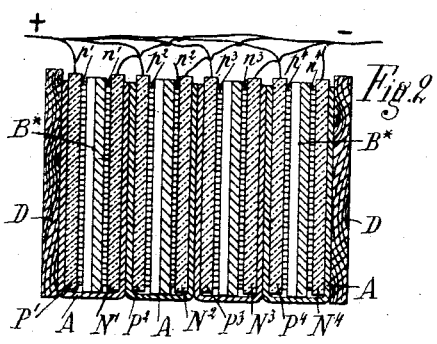
Figure 4:
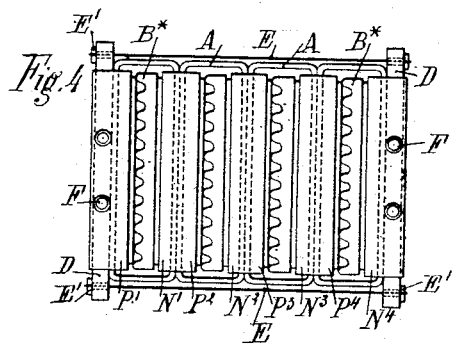
Figure 5:
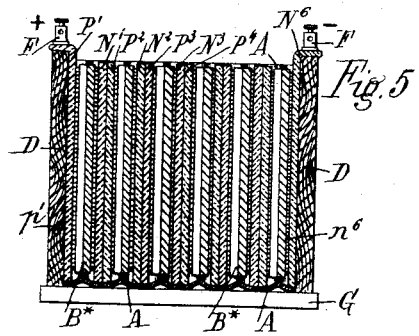
Figure 7:
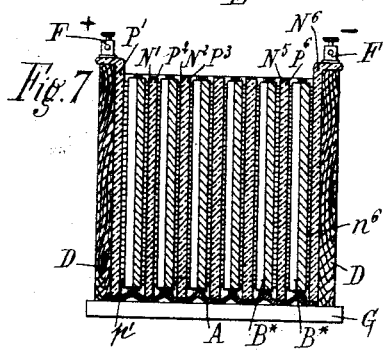
Figure 6:
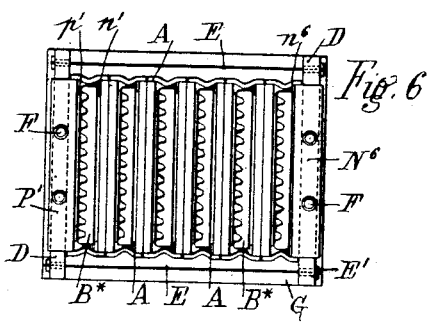
Figure 8:
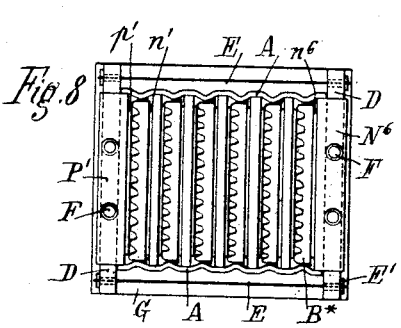

Figure 1 in the drawings represents in elevation, partly in section, an accumulator showing four electrodes arranged in the same supple receiver. Fig. 2 is a vertical sectional view showing the application of the invention to a battery of accumulators comprising four supple receivers, of which each contains two electrodes forming a couple. Fig. 3 is a vertical sectional view showing the mode of mounting which I prefer to employ for a battery coupled in tension. Fig. 4 is a plan view corresponding with Fig. 3. Fig. 5 represents a vertical section of an accumulator in which the supple receivers are constructed partly of metal and partly of supple insulating material. Fig. 6 is a plan view corresponding with Fig. 5. Fig. 7 is a vertical sectional view showing a modification of what is shown in Figs. 5 and 6. Fig. 8 is a plan view corresponding with Fig. 7. Fig. 9 is a perspective view, partly in section, on a larger scale than the preceding figures, of a battery of eight elements constructed according to my system. Fig. 10 represents a perspective view, partly in section, on a still larger scale, of a portion of a sheet or layer of active matter prepared in advance to be applied upon the electrode-plate and protected upon its edges by a border or binding, as will be hereinafter described.

Similar letters of reference designate corresponding parts in all the figures.

A designates a supple receiver, which may be entirely of supple insulating material—for example, india-rubber, gutta-percha, celluloid, or prepared cloth—as shown in Figs. 2, 3, 4, and 9, or else partly of metal and partly of supple insulating material, as shown in Figs. 5, 6, 7, and 8, or else entirely of thin supple metal, as lead or an alloy of lead, its character being always to present perpendicularly to the electrodes sufficient suppleness for its two walls parallel with the electrodes to be suitably spread apart and brought together during the expansion and contraction of the active matters with which the electrodes are faced.

When the receiver is entirely metallic, the necessary suppleness is given by constructing it in bellows fashion—like an accordion, for example—and it is arranged in such manner as to prevent all hurtful contact with the electrodes, which must not communicate electrically.

Referring now to Fig. 1, the supple receiver contains four electrode-plates, the two positive plates P' P² alternating with two negative plates N' N². The positive plates and the negative plates are respectively connected together. The extreme or outer plates P' N² are only covered with a layer of active matter $p'$ $n^2$ upon their internal faces, the external faces being against the wall of the receiver. The intermediate plates N' P² are covered on both sides with the active matter, as shown at $n'$ $n'p^{2*}$ $p^{2*}$. The active matter, previously compressed into sheets of suitable thickness, forms thin plates, which are simply placed against the electrodes. Consequently to maintain the said matter well applied against the electrode and to insure at the same time the elastic compression of the whole, it is necessary that all the parts should be well in contact. For this purpose the interval between two neighboring plates is exactly filled by an insulating-piece. To insure the circulation of the liquid and permit it to reach the active matter which covers the electrodes, this insulating-piece should be hollowed. It may therefore be constructed like a comb, a grate, or a series of bands, &c., in any suitable insulating material.

Fig. 1 represents the insulating-pieces in the form of a comb, B being the back of the comb and B' the teeth. As the compression of the active matters would not be sufficiently uniform, owing to the open form of the insulating-piece B B', I interpose between the said insulating-piece and the active matter a full partition C of porous material to allow the liquid to pass. In the case of the accumulators of the Planté kind this porous partition may be simply very thin wood. On opposite sides of the supple receiver A are clamping-plates D, parallel with the electrodes. The lateral edges of these two clamping-plates project beyond the receiver A in such manner as to receive springs E in convenient number, which are attached, respectively, to the two plates, and which tend to constantly press them toward each other in such manner as to insure the elastic compression of the active matters. These springs may be simply bands of india-rubber passing through the clamping-plates, secured against the backs thereof by pegs E', as shown in Fig. 1. As to the clamping-plates, they may be made of any material sufficiently rigid to prevent their being bent or deformed under the action of the expansion of the sheets or plates of the active matters or of the springs.

In the arrangement represented in Fig. 2 there are four supple cells A, each containing two electrodes P' N' P² N² P³ N³ P⁴ N⁴, which are bound together in the same manner as in the example shown in Fig. 1. The general arrangement is, moreover, the same, and will be understood without further explanation. The only difference is that I have represented in this figure a special kind of insulating-piece B*, which I prefer to employ. This piece is so porous as to permit free access of the liquid upon the sheets or plates of active matter $p'$ $n'$ $p^2$ $n^2$ $p^3$ $n^3$ $p^4$ $n^4$, and it may be made full and not hollowed, like those B B', hereinbefore described. This permits the doing away with the additional porous partitions C and the realization of a considerable simplification.

In accumulators of the Planté kind, the positive active matter (peroxide of lead) being harder than the negative active matter, (reduced lead,) the face of the porous partition which presses against the positive active matter may be channeled or corrugated, said matter being then held with sufficient uniformity, and the circulation of the liquid is better assured. This will be understood by reference to Figs. 2, 3, 4, and 9. If the natures of the active matters permit, both faces of the partition may be channeled or corrugated. The porous insulating-partitions B* may be made of porous earthenware or else of a composition of mineral matters—such as silicates, &c.,—or of cloth, or of silicious pastes.

Figs. 3 and 4 represent a battery analogous to that shown in Fig. 2, but in which the electrodes are connected for tension. In this case a special mode of mounting may be employed which renders them very compact. This mode is as follows: The two electrode-plates P' N⁴ are directly secured to two binding-screw posts F, secured upon the outer edges of the clamping-plates D. These screw-posts may be two in number on each plate to facilitate the electric connections. Each of the intermediate electrodes N' P² N² P³ N³ P⁴ is placed astride over the walls of two receivers in such manner as to enter one in which it is negative, as at N', and in the other in which it is positive, as at P², for example. In this way complicated and embarrassing joints are avoided. All the other arrangements of the battery are similar to those which have been described with reference to the preceding figures.

Figs. 5 and 6 represent a battery in which the supple cells have their bottom and their lateral walls made of supple material, the broad sides, parallel with the clamping-plates D, being rigid. If these broad sides are made of metal, as may be supposed in the drawings, they may be made to serve of themselves as electrode-plates. That is why I have designated them by the letters P' N' P² N², &c. The weight of the battery will thus be considerably reduced. The supple narrow sides and bottoms, made of an insulating and supple material—such as india-rubber, gutta-percha, &c.—are secured to the broad metal sides by means of a suitable cement, which preferably should be of a supple nature—for example, a cement having for its base india-rubber or gutta-percha. The two broad sides P' N', &c., of the same cells, which only communicate electrically through the intermediation of the liquid contained in the vessel, are covered with active material $p'$ $n'$, &c., upon their inner face, and the adjacent faces N' P² N² P³, &c., of two adjacent cells are maintained pressed together in contact with each other by the action of springs E, which are applied to the clamping-plates in the same manner as hereinbefore described.

Figs. 7 and 8 represent a simplified modification of the construction which I have just described. The electrodes N' P² N² P³, &c., which touch each other, being of the same potential, it is useless when they are of the same metal, as is the case with the accumulators of the Planté kind, to make them of two distinct plates. The two juxtaposed plates of two neighboring cells, as in the last-mentioned example, may then be replaced by a single plate which is common to the two cells and is positive on one face and negative on the other. It is also useless in this case to break up the lateral walls and the bottom of the cells formed by the spaces included between two plates. It is sufficient to cement the edges of these plates at desired intervals upon the supple lateral wall and bottom of one common receiver A, which consequently needs to have but three sides, the other two sides being formed by the end plates. The clamping-plates D and the springs E are here arranged as hereinbefore described.

In the two last-described arrangements I have represented the several cells of the battery arranged upon a support G, upon which they rest freely in such manner as to be capable of sliding without difficulty during the expansions and contractions of the active matters. This mode of construction is naturally applicable in all cases; but when the cells are numerous the amplitude and capability of the sliding movement upon the support should be great enough for the cells farthest from the middle, and the friction would then render this movement difficult. To obviate this inconvenience, I attach to the bottom of the clamping-plates D one or more elastic bands, upon which the receiver then rests and are themselves rested upon the support G. These bands have then the same movements as the bottoms of the receivers and obviate the sliding. This arrangement being easily intelligible, I have not thought it necessary to represent in the drawings.

Fig. 9 shows a battery with elements coupled for tension, as I have described with reference to Figs. 3 and 4. The battery is represented ready to be put in service. It is not necessary to repeat the description of the last-mentioned figures. I will simply point out that the lower support or base G for the supple cells has erected upon it at the middle of its length a fixed upright partition G', on opposite sides of which are arranged the cells. From this it results that the movements of the cells take place from the middle of the battery and their amplitude is less. This fixed partition G', which extends above the cells of the battery, has an opening through its upper part to allow the passage of the lead plate, which enters the two cells which it separates. In this manner the said partition G' is made to serve at the same time as a handle for transporting the battery. This battery is very compact and may be inclosed in a protecting-box. In this example the stop-pegs E' and the springs E are let into grooves provided for them in the clamping-plates D in such manner as to make no projections on the outer surfaces of the said plates. It will also be seen that the sheets of active matter $p'$ $n'$ $p^2$ $n^2$, &c., are held in place by flanges $p^*$, formed on the lower edges of the electrode-plates by turning in the said edges. The sheets of active matter then simply rest upon these flanges without any adherence to the electrode-plates, which only hold them by the compression of the clamping-plates and springs.

It may be understood that in my system of mounting, the sheets of active matter, though compressed and protected upon their broad faces, remain vulnerable at their edges. In order therefore to protect their perimeters, I reduce the thickness of their edges by any means whatever, and I furnish them upon the so reduced edges, as shown in Fig. 10, with a protecting-border or marginal frame O of insulating and incorrodible material—such as a composition having a base of gutta-percha, india-rubber, bitumen, &c.—the said frame being flush with or not projecting beyond the faces of the sheets.

I may remark that in all cases it is easy to connect the electrodes either in quantity or in tension or partly in quantity and partly in tension.

It is evident that in accumulators having one electrode soluble—such as those of the lead-sulphate-of-zinc kind—porous partitions are only necessary upon these electrodes, the active matter of which is insoluble. If accumulators with two liquids are required, porous cells may be conveniently adapted in such manner as not to prevent the normal compression produced upon the insoluble active matters by my system of mounting.

In my elastic accumulators the liquid, as in ordinary accumulators, may be thickened with jelly or starch by chemical processes or by the addition of pulverized or spongy matters, as glass, silicate, asbestus in powder or in fiber, wood sawdust, cellulose, &c. By suitably selecting the absorbents and agglomerating them more or less they may be made to take the place of the insulating porous partitions above mentioned.

What I claim as my invention, and desire to secure by Letters Patent, is—

1. The combination, with one or more pairs of electrode-plates faced with active matter, and an interposed insulating-plate for each pair of electrodes, of a supple receiver or cell containing said electrode and insulating-plates, and yielding clamping-plates applied outside of said receiver or cell, substantially as herein set forth.

2. The combination, with a series consisting of several pairs of electrodes faced with active matter, and interposed insulating-plates, of a supple receiver common to and containing all the said electrodes and plates, and yielding clamping-plates applied outside of said receiver, substantially as herein set forth.

3. The combination, with supple receivers or cells, of electrodes faced with active matter, elastically-pressed clamping-plates outside of said cells or receivers, and channeled or hollowed insulating-plates interposed between said electrodes, substantially as and for the purpose herein set forth.

4. The combination, with supple receivers or cells, of electrodes faced with active matter, exterior elastically-pressed clamping-plates, hollowed or channeled insulating-plates, and porous partitions interposed between the said insulating-plates and the active matter on the electrodes, substantially as and for the purpose herein set forth.

5. The combination, with supple receivers or cells, of electrodes faced with active matter, clamping-plates external to said cells or receivers, and channeled or hollowed partition-plates which are both porous and insulating interposed between the electrodes, substantially as and for the purpose herein set forth.

6. The combination, with a series of supple cells the two opposite faces of which are of metal and constitute electrodes and are coated with active matter and the sides and bottoms of which are of supple and insulating material, of clamping-plates external to said cells, and insulating-partitions interposed between the electrodes of each cell, substantially as and for the purpose herein set forth.

7. The combination, with a series of supple cells the two opposite faces of which are of metal and constitute electrodes and are faced with active matter and the sides and bottoms of which are of supple and insulating material, and clamping-plates external to said cells, of partitions which are both insulating and porous interposed between the electrodes of each cell, substantially as and for the purpose herein set forth.

8. The combination, with a series of parallel plates faced with active matter and serving as electrodes, and supple connections between the bottoms and sides of those of said plates at the end of the series and the bottoms and sides of the intermediate plates, connecting said plates to constitute cells, of partitions which are insulating or both insulating and porous interposed between said parallel plates, and elastically-pressed clamping-plates outside of said series of parallel plates, substantially as set forth.

9. The combination of supple cells, electrode-plates arranged in said cells and having at their lower edges flanges or projections, sheets of active matter applied to the faces of said plates and supported by said flanges or projections, partitions arranged between the said electrode-plates, and yielding clamping-plates arranged outside of the said cells, substantially as herein described.

10. The combination, with a series of supple cells or receivers, electrodes and interposed partitions within said cells or receivers, and yielding external clamping-plates outside of said cells, of a lower support or base upon which the said cells and clamping-plates are capable of sliding freely, substantially as herein described.

11. The combination, with a series of supple cells or receivers, electrodes and interposed partitions within said cells or receivers, and yielding external clamping-plates outside of said cells, of a lower support having erected upon it a fixed central partition on opposite sides of which the said cells and clamping-plates are supported and capable of sliding freely in opposite directions toward and from said partition, substantially as herein described.

12. The combination, for facing an electrode, of a sheet of active matter having its edges reduced in thickness, and a marginal frame or border of insulating and incorrodible material applied to the so-reduced edges, substantially as and for the purpose herein set forth.

EMILE NICOLAS REYNIER.

Witnesses:
LOUIS GENET,
ALCIDE FAKE.